Figure 1:
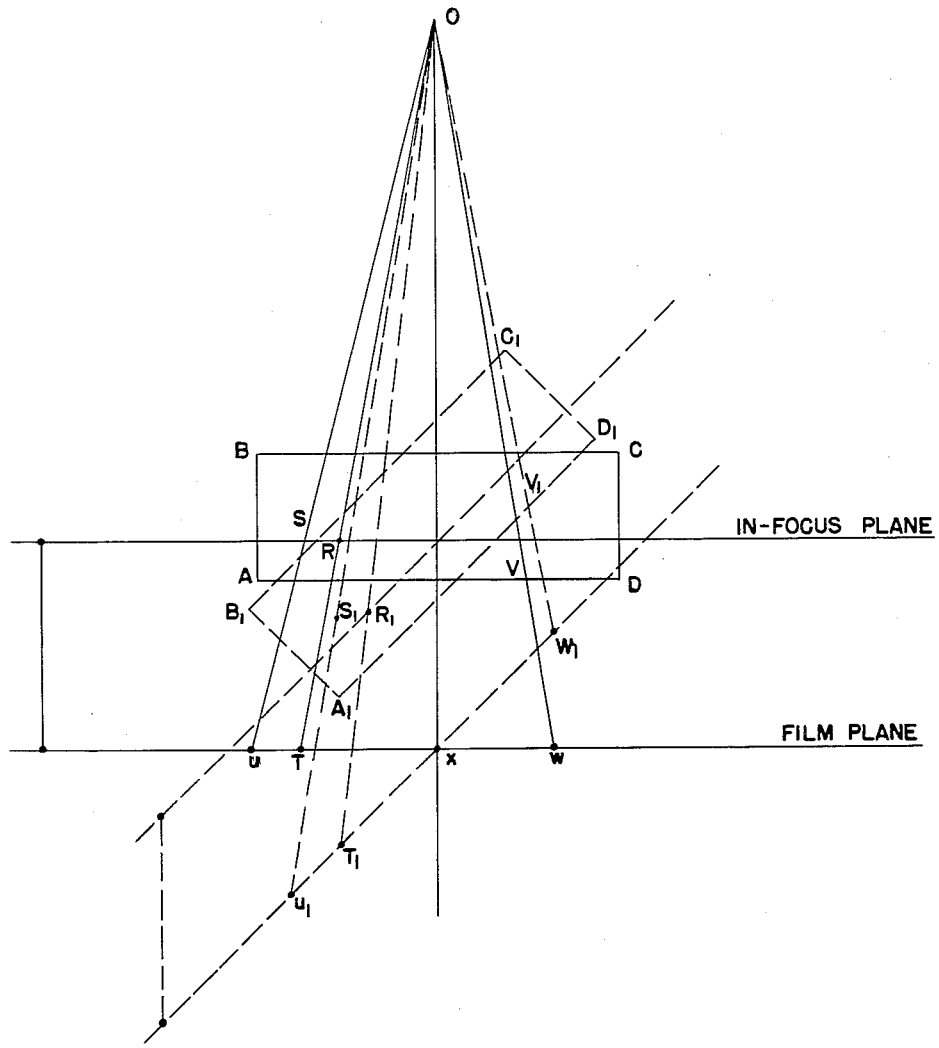

Oct. 11, 1955

C. H. ACKER 2,720,596

SPIRAL LAMINAGRAPH

Filed July 17, 1952

4 Sheets-Sheet 1

INVENTOR
CARL H. ACKER

BY

ATTORNEYS

Oct. 11, 1955     C. H. ACKER     2,720,596

SPIRAL LAMINAGRAPH

Filed July 17, 1952     4 Sheets-Sheet 3

INVENTOR
CARL H. ACKER

BY

ATTORNEYS

United States Patent Office 2,720,596
Patented Oct. 11, 1955

2,720,596

SPIRAL LAMINAGRAPH

Carl H. Acker, Philadelphia, Pa.

Application July 17, 1952, Serial No. 299,519

12 Claims. (Cl. 250—61.5)

(Granted under Title 35, U. S. Code (1952), sec. 266)

The invention described herein may be manufactured and used by or for the Government of the United States of America for governmental purposes without the payment of any royalties thereon or therefor.

This invention relates to a spiral laminagraph and more particularly to a device for making an X-ray exposure of a selected plane within an object by blurring the details of all other planes.

In order to portray with greater accuracy the internal components of objects, such as ordnance equipment, it has been found that the most effective mechanism is that which will clearly reproduce the structure along a selected plane and will blur all other internal structure. To accomplish this result it is necessary to move the film plane and X-ray tube with respect to the object or to move the object and film plane with respect to a stationary tube. Prior art methods include devices which produce rectilinear motion of the X-ray tube and film plane in opposite directions with respect to a stationary object whereby rectilinear blurring is effected. The disadvantage in such a method is that objectionable streaks are produced on the film. Circular blurring has also been employed but this method produces circular streaks on the film and does not uniformly blur all structure other than that in the selected plane. Since the present invention is designed particularly for use with ordnance equipment and the X-ray tube employed for such purposes is of such size as to make movement thereof impractical, the film plane and object are moved with respect to the stationary X-ray tube.

In order to overcome the disadvantages inherent in the prior art devices, the invention disclosed herein provides a means for producing spiral blurring which eliminates the negative streaks of rectilinear and circular blurring and effectively blurs all structure other than that in the selected plane. By providing a means for producing uniform linear velocity in tracing all points not in the selected plane through a spiral pattern the negative is uniformly exposed. There is further provided a means for selecting the uniform plane whereby a series of exposures along different planes within the same object may be produced.

An object of the present invention is to provide a means for making an X-ray exposure of a selected plane within an object by tracing a spiral pattern for all points within the object not in the selected plane.

A further object of this invention is to provide a device for producing an X-ray negative of an object in which the internal components along a selected plane are in focus and all other structure is spirally blurred at a uniform linear velocity.

Still another object of this invention is to provide a means for taking an X-ray negative of a selected plane in an object in which the X-ray tube is stationary and the object and film plane are moved through a spiral pattern at a uniform linear velocity.

Figure 2:
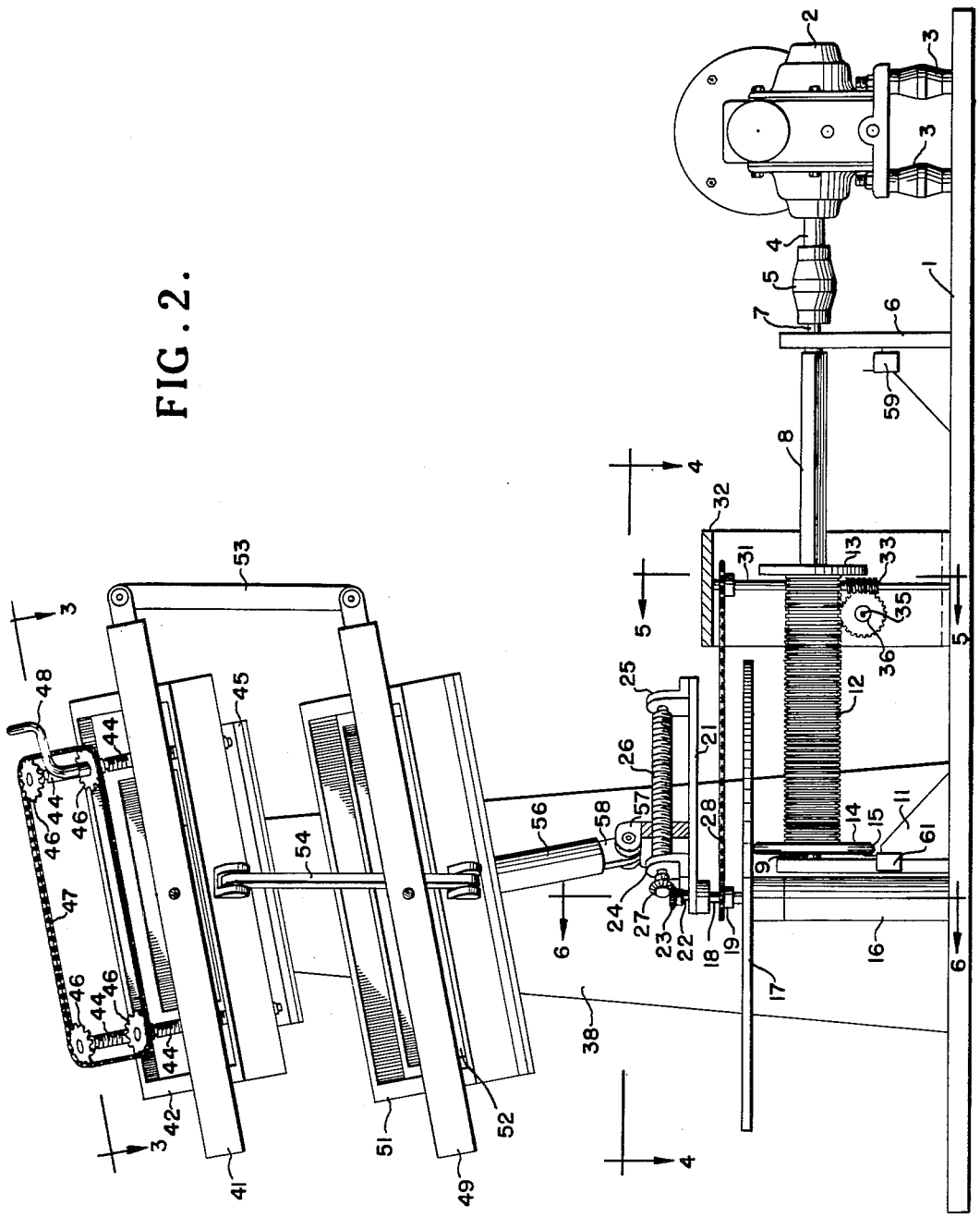
Figure 3:
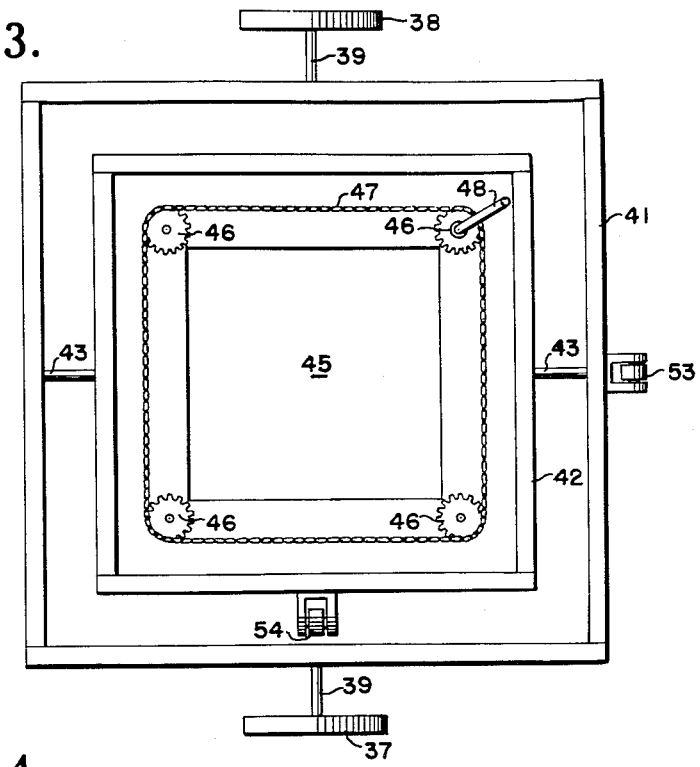
Figure 4:
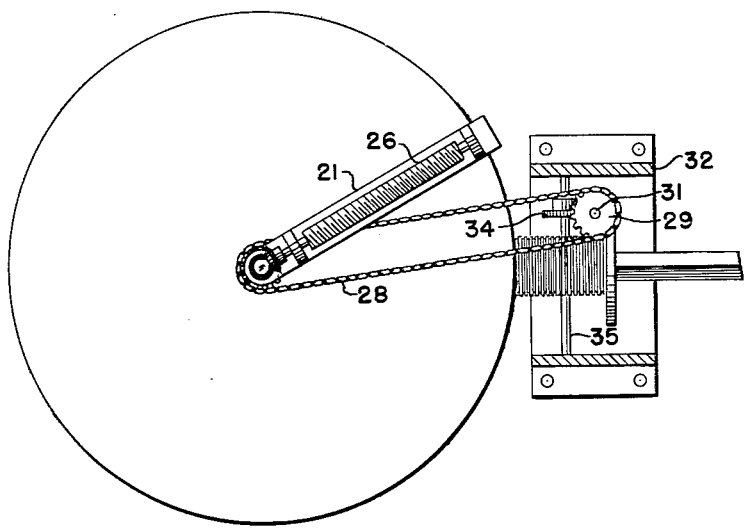
Figure 5:
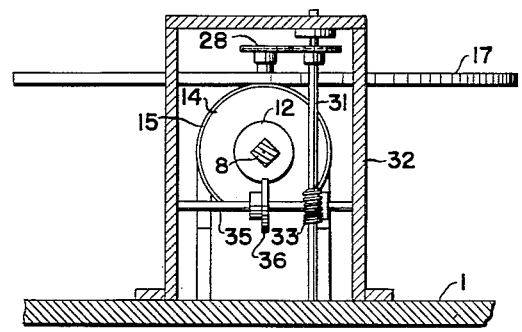
Figure 6:
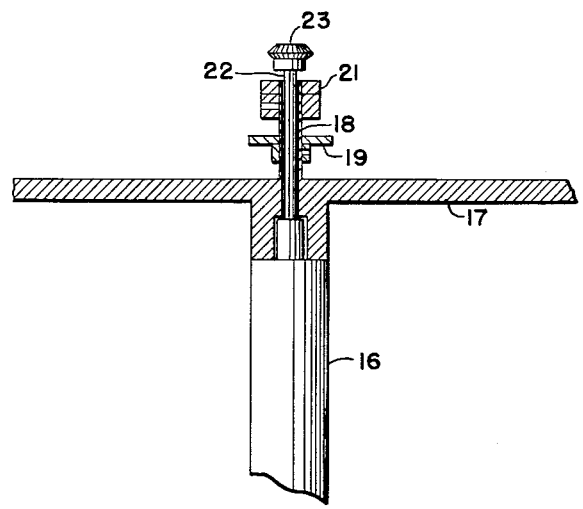

Other objects and many of the attendant advantages of this invention will be readily appreciated as the same becomes better understood by reference to the following detailed description when considered in connection with the accompanying drawings wherein:

Fig. 1 is a diagrammatic view of the geometrical relations of the spiral laminagraph, Fig. 2 is a side elevation of the present invention with parts broken away to show certain details, Fig. 3 is a plan view of the object holding tray along the line 3—3 of Fig. 2, Fig. 4 is a plan view partly in section along the line 4—4 of Fig. 2, Fig. 5 is a vertical sectional view along the line 5—5 of Fig. 2, and Fig. 6 is a sectional view along the line 6—6 of Fig. 2.

Referring now to Fig. 1 the theory involved in the operation of the presently disclosed apparatus will be described in detail. The in-focus plane and film plane are shown in two positions. These planes are always maintained parallel and are moved through a spiral pattern. The object to be X-rayed is represented by the rectangle ABCD in one position and by the rectangle $A_1B_1C_1D_1$ in the other position. The point R in the object will be reproduced at point T in the film plane and in the dotted line position of the device $R_1$ is reproducted at $T_1$. Since $XT=XT_1$ it is apparent that a clear X-ray negative of the point R will be produced. The points S and V which are within object ABCD but are not in the in-focus plane are also shown. The point S is reproduced at point U and the point V is reproduced at point W. It can be seen that $UX \neq U_1X$ and $WX \neq W_1X$ and that therefore points S and V will be blurred in the X-ray negative. Since the in-focus plane and film plane are moved in a spiral pattern, spiral blurring is produced and thereby the objectionable streaking of rectilinear and circular blurring is eliminated.

Referring now to Fig. 2 wherein the apparatus is shown with certain parts broken away it can be seen that there is provided a base 1 having mounted thereon all the operative elements necessary to cause spiral movement of both the object to be X-rayed and the film plate. Mounted in the base adjacent one end thereof is a constant speed motor and right angle gearbox assembly 2 hereinafter referred to as a motor assembly. It is supported above the base by resilient elements 3. Motor assembly 2 is provided with a shaft 4 extending therefrom, the shaft having flexible coupling 5 secured to the end portion thereof. Extending into this flexible coupling is the circular end portion 7 of a square drive shaft 8. A bracket 6 secured to base 1 is provided with an aperture therethrough with roller bearings to support this shaft. The other end of shaft 8 is rounded as at 9 to be disposed within a bearing on bracket 11. There is provided a cylindrical rack member 12 which has a square bore therethrough (Fig. 5) so that the rack member fits snugly on the square shaft 8. Securely mounted on the ends of the rack member 12 are circular plates 13 and 14. Plate 14 is provided with a recessed periphery within which is disposed a rubber ring 15. It can be seen that upon energization of motor assembly 2 the shaft 8, rack 12 and plates 13 and 14 will be rotated.

Fixedly mounted on base 1 is a post 16 upon which is rotatably disposed a friction disc 17. Extending upwardly from this disc and secured thereto is a sleeve 18 (Fig. 6). Sleeve 18 has fixedly mounted thereon a sprocket 19 and an arm 21. A shaft 22 integral with post 16 extends upwardly through the bore in sleeve 18. Disposed on the end portion of shaft 22 is a fixed bevel gear 23. Arm 21 is provided with brackets 24 and 25 which serve as supporting bearings for a lead screw 26 which has a bevel gear 27 mounted on the end thereof engaging gear 23. It can be seen that, as motor 2 drives plate 14, friction disc 17 will be rotated thereby causing gear 19 and arm 21 to rotate. Since bevel gear 23 remains stationary, the lead screw 26 will be rotated as arm 21 rotates.

Engaging sprocket 19 is a sprocket chain 28 which drives a sprocket 29 (Fig. 4) fixed on a shaft 31 which is journalled in the underside of a frame or bracket 32 and in base 1 (Fig. 2). Sprocket 29 through shaft 31 drives worm 33 which engages a worm gear 34 (Fig. 4) mounted on a shaft 35 journalled in the side walls of bracket 32. Mounted on shaft 35 is a spur gear 36 (Figs. 2 and 5) engaging the cylindrical rack 12. It can be seen that, as the motor assembly 2 and intermediate drives move arm 21, the spur gear 36 will move the cylindrical rack 12 and plates 13 and 14 outwardly along shaft 8. As plate 14 moves outwardly of disc 17 the rate of rotation of the disc is decreased thereby decreasing the rate of rotation of arm 21.

Suitably secured on opposite sides of base 1 are uprights 37 and 38 (Fig. 3). Pivoted as by pins 39 to the upper ends of these uprights is a rectangular outer frame 41. Within this outer frame is an inner frame 42 pivoted to the outer frame by means of pins 43. Screw threaded in the inner frame are four elevating screws 44 (Fig. 2) the lower ends of which are journalled in a plate 45. The upper end of each elevating screw is provided with a sprocket 46 and a sprocket chain 47 extends around the four sprockets. A crank 48 is provided on one elevating screw and it can be seen that rotation of this crank will cause simultaneous motion of all the elevating screws thereby raising or lowering the plate 45 with respect to the inner and outer upper frames.

Pivotally mounted between uprights 37 and 38 beneath frames 41 and 42 is a lower outer frame 49 within which is pivoted an inner frame 51. The mounting for frames 49 and 51 is identical with that shown for frames 41 and 42. The inner lower frame 51 is provided with a film supporting plate or screen 52 which encloses the bottom of the inner frame. The outer frames 41 and 49 are pivoted together for simultaneous movement by means of link 53 and the inner frames 42 and 51 are pivoted together for simultaneous movement by means of link 54. The mountings for link 54 on frames 42 and 51 is by means of swivel joints to permit free movement of the frames. Secured to the bottom face of film supporting plate 52 is a sleeve 56.

The lead screw 26 has a travelling nut 57 thereon to which is pivoted a rod 58 which with sleeve 56 forms a telescopic connection between arm 21 and the film supporting plate. It can be seen therefore that as arm 21 rotates the upper and lower frames will move in unison through a tilting angle determined by the position of the travelling nut 57 on screw 26. It can be seen that as the nut moves outwardly on the screw the tilting angle increases and that as the plate 14 moves outwardly on the disc 17 the rate of rotation of arm 21 is decreased. There is provided on bracket 6 a reversing switch 59 which is actuated by plate 13 and mounted on bracket 11 is a reversing switch 61 actuated by plate 14. It is apparent therefore that the apparatus will operate continuously and the cylindrical rack 12 will run inwardly and outwardly on shaft 8 actuating the two reversing switches.

In the operation of the presently disclosed device the apparatus is located beneath a stationary X-ray tube in such a manner that the rays will pass through the upper frames and focus on the film supporting plate 52. The object to be radiographed is placed on plate 45 and crank 48 is operated to raise or lower this plate until the selected plane of the object coincides with the plane of the upper inner frame 42. The film is placed on plate 52 and motor 2 is energized. The motion of the upper and lower frames causes all structures within the object to be spirally blurred on the film except that structure in the selected plane which is maintained in focus since the frame 42 is parallel to frame 51 at all times. Spiral blurring is produced since the degree of tilt is constantly varied by the movement of nut 57 on screw 26. This spiral blurring is produced at a constant linear velocity since as the nut moves outwardly on the screw increasing the angle of tilt the plate 14 moves outwardly on disc 17 decreasing the rate of rotation of arm 17. In this manner streaking on the film is eliminated and there is produced on the film a clear X-ray of the structure within the object on the plane coinciding with the inner frame 42 with all other internal components blurred.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent is:

1. Apparatus for making radiographs of a selected plane within an object from a fixed X-ray source comprising, object holding means, film holding means, gimbal means mounting said first and said second named means, means for maintaining said first and said second named means parallel in all positions thereof, and means for tilting said film holding means simultaneously about both gimbal axes so that rays from the X-ray source trace out on a film a spiral pattern of all points within an object except the points within the selected plane.

2. In a device for making radiographs of a selected plane within an object from a fixed source of X-ray radiation, supporting members, vertically spaced frames pivotally mounted on said supporting members, link means pivotally interconnecting said frames, trays, one of said trays disposed within each of said frames and pivotally mounted therein, link means pivotally interconnecting said trays, said upper and said lower trays adapted to support respectively the object to be radiographed and a film, and means for moving said trays about the pivotal axes of the frames and the pivotal axes of the tray simultaneously through a predetermined pattern so that all points within said object not in the selected plane are spirally blurred on said film.

3. In a device of the class described, object supporting means mounted in gimbals, film supporting means mounted in gimbals, means pivotally interconnecting said second named means with said first named means, drive means for tilting said film supporting means and said object supporting means simultaneously about both gimbal axes of the respective gimbals in such a manner that a stationary beam of X-rays focused on said film supporting means traces a spiral pattern and means for maintaining said spiral trace at a uniform linear velocity.

4. In a device of the class described for radiography from a fixed radiant energy source, supporting members, vertically spaced outer frames pivoted to said members, vertically spaced, inner frames pivoted within said outer frames, a plate supported by the upper inner frame, means for moving said plate with respect to said upper frame, a film supporting screen mounted within the lower inner frame, link means pivotally interconnecting said upper and lower outer frames, link means pivotally interconnecting said upper and lower inner frames, means for simultaneously moving said frames about the respective pivotal axis thereof through a predetermined pattern, and means for continuously varying the speed of said frame moving means whereby a selected plane within an object may be radiographed by supporting the object on said plate and by adjusting the plate with respect to the upper frame to a position wherein the selected plane coincides with the plane of the upper inner frame.

5. An apparatus for making radiographs of a selected plane within an object comprising in combination, an object supporting tray, a film supporting tray, gimbal means supporting said trays, link means for maintaining parallel motion of said trays, motor means, an arm rotatably driven by said motor means, a telescopic member secured to said film supporting tray and pivotally mounted on said arm, means whereby said telescopic member is moved inwardly and outwardly of said arm, and means for varying the rate of rotation of said arm as the telescopic member is moved whereby upon making a radiograph of an object all structure not within the selected plane is spirally blurred at a uniform linear velocity.

6. An apparatus for making a radiograph of a selected plane within an object comprising, a motor, a shaft driven by said motor, a plate slidably mounted on said shaft, a friction disc rotatably driven by said motor through engagement with said plate, means for moving said plate with respect to the center of said friction disc whereby the rate of rotation of said disc is varied, an arm rotatably driven by said friction disc, a film supporting tray, an object supporting tray, gimbal means mounting said trays in vertically spaced relation means interconnecting said trays for parallel motion, a telescopic member secured to said film supporting tray and pivoted on said arm whereby rotary motion of said arm imparts tilting motion to said trays, means for varying the degree of said tilting motion in correlation with a variance in the rate of rotation of said arm whereby upon making a radiograph of an object all internal structure thereof is spirally blurred except that structure lying in the selected plane.

7. In an apparatus for making a radiograph of a selected plane within an object, a base, a pair of spaced vertically upstanding supports secured to said base, a pair of spaced outer rectangular frames pivoted to said supports, link means pivotally interconnecting said outer frames, inner frames, an inner frame pivoted within each of said outer frames, link means pivotally interconnecting said inner frames, an object supporting plate, means adjustably supporting said plate from the upper inner frame, a film supporting screen supported within the lower inner frame, motor means mounted on said base, a shaft extending from said motor and having a circular plate mounted thereon, a rotatably mounted friction disc adapted to be driven by said circular plate, an arm rotatably driven by said friction disc, a telescopic member pivotally supported on said arm and secured to said film supporting screen whereby upon actuation of said motor means the film supporting screen and the object supporting plate are tilted, means for varying the position of said telescopic member on said arm so as to vary the degree of tilt of said film supporting screen and said object supporting plate, and means for varying the rate of rotation of said arm in correlation with the degree of tilt of said screen and plate as determined by said last named means.

8. In an apparatus for making radiographs of a selected plane within an object, a base, vertically spaced uprights secured to said base, object holding means, film retaining means, gimbal means mounting said object holding means and said film retaining means in vertically spaced relation between said uprights, a motor mounted on said base, a shaft extending from said motor, said shaft having a grooved cylinder slidably mounted thereon and rotatable therewith, a circular plate mounted on the end of said cylinder, a friction disc rotatably mounted on said base having one face thereof in engagement with said circular plate, and having a shaft extending upwardly therefrom, an arm mounted on said last named shaft and rotatable therewith, a screw rotatably mounted on said arm, means for rotating said screw with respect to said arm as the arm rotates, a traveling nut on said screw, telescopic means secured to said film retaining means and pivotally mounted on said traveling nut, link means pivotally interconnecting said film retaining means and said object holding means, and means engaging said grooved cylinder and operatively connected to said last named shaft for altering the position of the circular plate on said friction disc for varying the rate of rotation thereof whereby upon energization of said motor said film retaining means and said object holding means are tilted through an angle determined by the position of the traveling nut on the screw and at a rate determined by the position of the circular plate on the friction disc.

9. An apparatus of the class described comprising, in combination, a base, a pair of spaced uprights secured to said base, a rectangular upper frame pivotally mounted on said uprights, an inner frame pivoted within said upper frame, an object supporting plate, means adjustably mounting said plate on said inner frame whereby the plate may be vertically offset with respect to said inner frame, a rectangular lower frame pivotally mounted on said uprights in vertically spaced relation to said upper frame, an inner frame providing film supporting means, said inner frame being pivoted within said lower frame, link means pivotally interconnecting said upper and lower frames, a motor mounted on said base, a shaft extending from said motor, a grooved cylinder slidably disposed on said shaft and rotatable therewith, a circular plate secured to an end portion of said cylinder, a horizontally disposed friction disc rotatably mounted on said base and having the lower face thereof in engagement with said circular plate, a shaft extending upwardly from said friction disc and rotatable therewith, an arm secured to said shaft, a screw rotatably mounted on said arm, means for rotating the screw with respect to the arm as the arm rotates, a traveling nut on said screw, telescopic means pivotally mounted on said traveling nut and secured to said film supporting means whereby the film supporting means and object supporting plate are tilted when the motor is energized, and means including a gear mounted on said last named shaft, a gear engaging said grooved cylinder, and means interconnecting said gears for varying the distance from the center of the friction disc to the point of engagement of the disc with the circular plate whereby the rate of rotation of the friction disc is varied.

10. A method for making a radiograph of a selected plane within an object which comprises tilting the film with respect to a stationary X-ray tube about two mutually perpendicular axes in the plane of the film simultaneously, constantly varying the degree of tilt and maintaining the object and film parallel during the movement.

11. A method for making a radiograph of a selected plane within an object comprising tilting the film with respect to a stationary X-ray tube about two mutually perpendicular axes in the plane of the film simultaneously, constantly varying the degree of tilt, constantly varying the rate of tilt in correlation with the degree of tilt and maintaining the film and object parallel during such movement.

12. A method for making a radiograph of a selected plane within an object comprising tilting the object and film longitudinally and transversely with respect to a stationary X-ray tube, maintaining the film and object parallel during such movement, varying the degree of tilt so that all internal structure within the object not within the selected plane is spirally blurred on the film and varying the rate of movement of the object and the film so that the spiral blurring is produced at a uniform linear velocity.

References Cited in the file of this patent
UNITED STATES PATENTS

| | | |
|---|---|---|
| 2,167,116 | Kieffer | July 26, 1939 |
| 2,196,618 | Watson | Apr. 9, 1940 |
| 2,353,145 | Chamberlain, Jr. | July 11, 1944 |
| 2,400,516 | Kieffer | May 21, 1946 |